(12) United States Patent
Boussaguet et al.

(10) Patent No.: US 9,097,333 B2
(45) Date of Patent: Aug. 4, 2015

(54) WEAR COMPENSATION DEVICE FOR A GEAR SET WITH TEMPORARY ANGULAR PRE-INDEXING, AND ASSOCIATED MOUNTING METHOD

(71) Applicants: Jerome Boussaguet, Nieuwegein (NL); Sylvain Bussit, Monnaie (FR); Daniel Jansen, Tours (FR); Thomas Lepine, Villandry (FR); Bruno Montboeuf, Cerelles (FR)

(72) Inventors: Jerome Boussaguet, Nieuwegein (NL); Sylvain Bussit, Monnaie (FR); Daniel Jansen, Tours (FR); Thomas Lepine, Villandry (FR); Bruno Montboeuf, Cerelles (FR)

(73) Assignee: AKTIEBOLAGET SKF, Gothenburg (SE)

( * ) Notice: Subject to any disclaimer, the term of this patent is extended or adjusted under 35 U.S.C. 154(b) by 9 days.

(21) Appl. No.: 13/868,748

(22) Filed: Apr. 23, 2013

(65) Prior Publication Data
US 2013/0291671 A1 Nov. 7, 2013

(30) Foreign Application Priority Data
Apr. 23, 2012 (FR) ...................... 12 53677

(51) Int. Cl.
| | | |
|---|---|---|
| *B62D 5/04* | (2006.01) |
| *F16H 57/12* | (2006.01) |
| *F16H 55/24* | (2006.01) |
| *F16C 23/10* | (2006.01) |
| *F16H 57/021* | (2012.01) |
| *F16H 57/022* | (2012.01) |

(52) U.S. Cl.
CPC ............... *F16H 57/12* (2013.01); *F16C 23/10* (2013.01); *F16H 55/24* (2013.01); *F16H 57/021* (2013.01); *F16H 2057/0213* (2013.01); *F16H 2057/0224* (2013.01); *Y10T 29/49826* (2015.01); *Y10T 74/19623* (2015.01)

(58) Field of Classification Search
CPC ...................................................... F16H 57/12
USPC ................................................. 180/444, 446
See application file for complete search history.

(56) References Cited

U.S. PATENT DOCUMENTS

| | | | |
|---|---|---|---|
| 2,989,874 A | 6/1961 | Johnson | |
| 8,327,971 B2 * | 12/2012 | Kim ............................ | 180/444 |
| 2009/0255751 A1 | 10/2009 | Kondo et al. | |
| 2010/0181139 A1 * | 7/2010 | Tokura et al. ................ | 180/444 |
| 2014/0041957 A1 * | 2/2014 | Cymbal et al. ............... | 180/444 |

FOREIGN PATENT DOCUMENTS

| | | |
|---|---|---|
| DE | 10053183 A1 | 6/2001 |
| DE | 102010003313 A1 | 9/2011 |

* cited by examiner

*Primary Examiner* — Joseph Rocca
*Assistant Examiner* — Marlon Arce
(74) *Attorney, Agent, or Firm* — Bryan Peckjian; SKF USA Inc. Patent Dept.

(57) ABSTRACT

The wear compensation device for a gear set comprises a support for attaching the device to an external element, a bearing intended to be mounted on a shaft comprising one of the wheels of the gear set, an eccentric mounted on the bearing and able to move angularly with respect to the support, an actuator mounted axially between the support and the eccentric and able to apply a circumferential force to the said eccentric, and at least one maintaining means for temporarily maintaining the angular indexing of the eccentric relative to the support in an angular position in which the actuator is preloaded between the said eccentric and the said support.

19 Claims, 7 Drawing Sheets

WEAR COMPENSATION DEVICE FOR A GEAR SET WITH TEMPORARY ANGULAR PRE-INDEXING, AND ASSOCIATED MOUNTING METHOD

CROSS-REFERENCE TO RELATED APPLICATIONS

This application claims priority to French patent application no. 1253677, filed Apr. 23, 2012, the contents of which are fully herein incorporated by reference.

FIELD OF THE INVENTION

The present invention relates to the field of wear compensation devices for gear sets, used notably in power steering mechanisms for motor vehicles.

BACKGROUND OF THE INVENTION

A power steering mechanism comprises an electric assisting steering motor and a worm mounted on an output shaft of the said motor and meshing with a gear wheel for example attached to the steering column shaft or connected to the steering rack via an intermediate pinion.

In general, the power steering mechanism further comprises a system for automatically compensating for the wearing of the thread or threads of the worm and/or of the teeth of the associated gear wheel which may occur over the course of time. For further details, reference may, for example, be made to document DE-A1-100 53 183 which illustrates such a wear compensation system.

In that document, the wear compensation system notably comprises an eccentric mounted at one end of the worm via a rolling-contact bearing and coming into radial contact in the bore of a tubular housing, a rotation-proofing element mounted on the eccentric and a torsion spring mounted between the said rotation-proofing element and the eccentric and forming a means making it possible constantly to apply a circumferential force to the eccentric.

The wear compensation system described in that document has the notable disadvantage of requiring a great many operations when it is being mounted onto the worm. Further, it is necessary to provide a step of adjusting the relative angular orientation of the rotation-proofing element and of the eccentric so as to preload the torsion spring.

The present invention seeks to overcome these disadvantages.

SUMMARY OF THE INVENTION

More specifically, the present invention seeks to provide a wear compensation device for a gear set that is easy to manufacture and to assemble with a limited number of operations, and is of small bulk and economical.

The present invention also seeks to provide a device that allows the end user to dispense with the need for any operation during mounting that would entail preloading the means designed to apply a circumferential force to the eccentric.

In one embodiment, the wear compensation device for a gear set comprises a support for attaching the device to an external element, a bearing intended to be mounted on a shaft comprising one of the wheels of the gear set, and an eccentric mounted on the bearing and able to move angularly with respect to the support, an actuator mounted axially between the support and the eccentric and able to apply a circumferential force to the said eccentric, and at least one maintaining means for temporarily maintaining the angular indexing of the eccentric relative to the support in an angular position in which the actuator is preloaded between the said eccentric and the said support.

The eccentric may be able to move angularly with respect to the support about an axis that is radially offset with respect to an axis of the bearing.

For preference, the said temporary maintaining means is removable. In one embodiment, the said temporary maintaining means comprises a pin extending at least partially into the eccentric and the support. The pin may extend into a hole passing through the support and a groove of the eccentric. The groove extends, preferably axially, into the thickness of an axial portion of the eccentric that forms a portion for centring of the actuator.

In one embodiment, the actuator is a torsion spring. The torsion spring may comprise a first end attached to the eccentric and an opposite, second end attached to the support.

Advantageously, the eccentric comprises retaining means able to collaborate with the support to retain the eccentric axially relative to the said support. The retaining means of the eccentric may be separate from the said temporary maintaining means.

In one embodiment, the bearing comprises an inner ring intended to be mounted on the shaft comprising one of the gear wheels and an outer ring on which the eccentric is mounted. The bearing may also comprise at least one row of rolling elements arranged between the said rings.

According to another aspect, the invention also relates to a power steering mechanism for a motor vehicle comprising a wear compensation device as defined hereinabove.

According to another aspect, the invention further relates to a method of assembling a wear compensation device as defined hereinabove, in which the support is fixed to the element outside the device and the shaft is mounted into the bore of the bearing while maintaining the angular indexing of the eccentric relative to the support, then the temporary maintaining means is removed from the device.

BRIEF DESCRIPTION OF THE DRAWINGS

The present invention will be better understood from a study of the detailed description of some embodiments considered solely by way of nonlimiting examples and illustrated by the attached drawings in which.

DETAILED DESCRIPTION OF THE INVENTION

Figure 1:
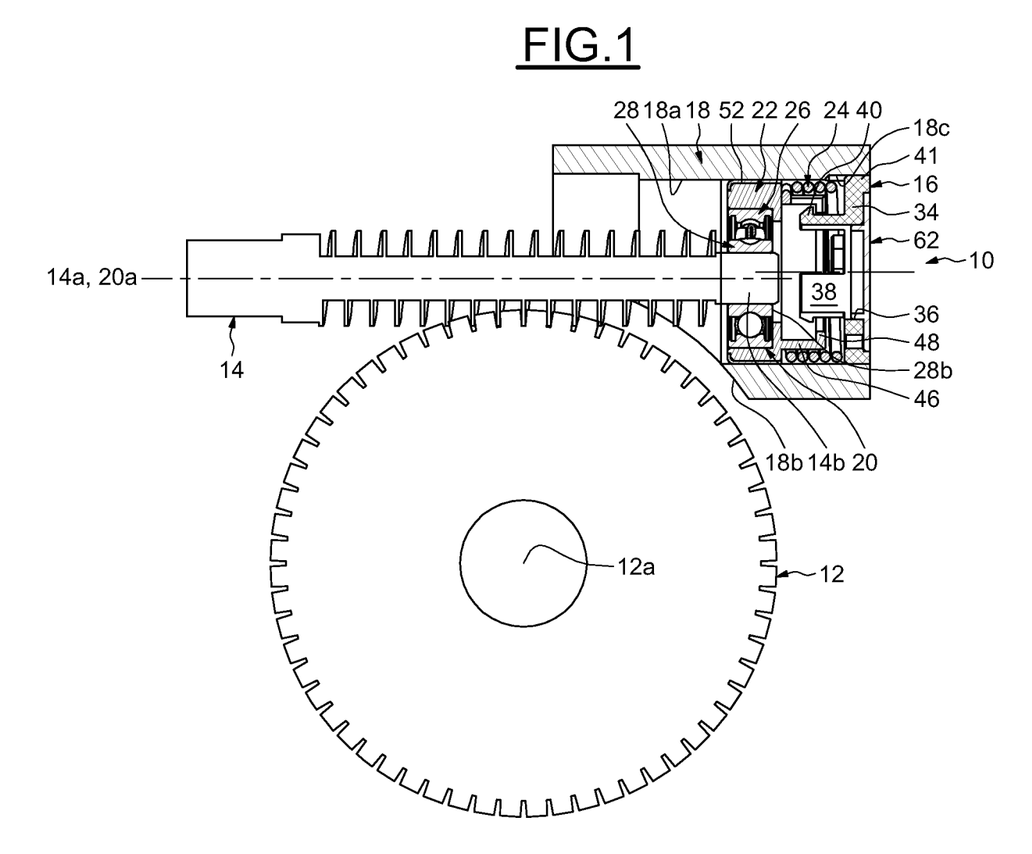
FIG. 1 is a view in axial section of a wear compensation device according to a first embodiment of the invention associated with a worm and wheel.

In FIG. 1, a wear compensation device, referenced 10 overall, is associated with a gear set of the worm 14 and wheel 12 type. The gear set illustrated is a skew-axes gear set and the axes 12a, 14a of the gear wheel and of the worm are orthogonal.

The device 10 comprises a support 16 intended to be attached to a tubular housing 18 of the worm which is external to the said device, a rolling-contact bearing 20 mounted on an end journal 14b of the worm, an eccentric 22 mounted on the rolling-contact bearing and intended to come directly or indirectly into contact with the housing, and a torsion spring 24 constantly to apply a circumferential force between the support 16 and the said eccentric. As will be described in further detail later, the device 10 also comprises means allowing the eccentric 22 to be temporarily angularly pre-indexed with respect to the support 16.

The worm 14 extends axially partly into a bore 18a of the housing 18. The housing comprises, at one axial end of the bore 18a, an opening 18b through which the gear wheel 12 can pass so that the thread or threads of the worm mesh with the toothset of the wheel.

The bearing 20 has an axis 20a of rotation coaxial with the axis 14a of the worm. As illustrated more visibly in FIG. 2, the bearing 20 comprises an outer ring 26 on which the eccentric 22 is mounted, an inner ring 28 designed to be mounted on the journal 14b of the worm, a plurality of rolling elements 30, here produced in the form of balls, and a cage 32 for maintaining the even circumferential spacing of the rolling elements.

Figure 2:
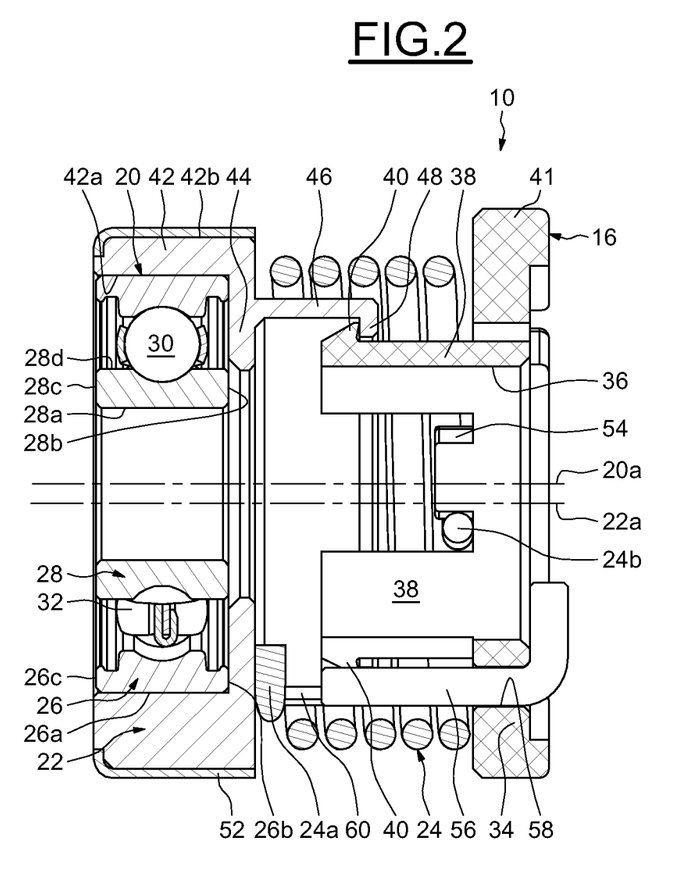
FIG. 2 is a view in axial section of the device of FIG. 1 after angular pre-indexing and prior to mounting.

The outer ring 26 comprises a cylindrical axial outer surface 26a on which the eccentric 22 is mounted, a stepped bore, two opposite frontal radial surfaces 26b and 26c and a deep-groove raceway formed substantially in the middle of the bore and having in cross section a concave internal profile suited to the rolling elements 30, the said raceway facing radially inwards.

The inner ring 28 comprises a cylindrical bore 28a in which the journal 14b of the worm is mounted, two opposite radial frontal surfaces 28b and 28c, a cylindrical axial outer surface 28d, and a deep-groove raceway formed substantially in the middle of the outer surface 28d and having in cross section a concave internal profile suited to the rolling elements 30, the said raceway facing radially outwards. The frontal surface 28b, 28c is situated in a radial plane containing the respective frontal surface 26b, 26c of the outer ring.

In the embodiment illustrated, the outer ring 14 and the inner ring 16 are solid. What is meant by a "solid ring" is a ring the shape of which is obtained by machining with the removal of chips (by turning or grinding) from tubes, bar stock, forged and/or rolled blanks.

The fixed support 16 comprises an annular radial wall 34 comprising a cylindrical axial bore 36 that has a diameter greater than the diameter of the bore 28a of the inner ring of the bearing. The support 16 also comprises a plurality of axial tabs 38 extending from the radial wall 34 axially on the side of the eccentric 22 and of the bearing 20. The tabs 38 partially extend the bore 36 of the support in an axial direction and are spaced apart evenly in the circumferential direction. In the embodiment illustrated, there are three of these tabs 38. Each tab 38 at its free end has a hook 40 extending radially outwards and designed to collaborate with the eccentric 22 in order to secure the support 16 and the said eccentric axially.

The support 16 further comprises, at the cylindrical exterior surface of the radial wall 34, a radial protrusion 41 designed to become lodged in a groove 18c (FIG. 1) of corresponding shape formed at one axial end of the bore 18a of the housing. The groove 18c extends radially outwards from the bore 18a. The support 16 may for example be made of a single piece by moulding a synthetic material.

The eccentric 22 is able to move angularly with respect to the fixed support 16, to the inner ring 28 of the bearing, to the housing 18 and to the worm 14. The eccentric 22 may, for example, be made as a single piece of a metallic material or alternatively by moulding a synthetic one.

The eccentric 22 comprises a large-diameter annular axial portion 42 having a cylindrical bore 42a in which the outer ring 26 of the bearing is tightly fitted, and with a cylindrical outer surface 42b, of axis 22a which is parallel to and radially offset with respect to the axis 20a of the bearing. The outer surface 42b of the bore may come directly or indirectly into contact with the housing 18.

The eccentric 22 further comprises an annular radial portion 44 extending radially inwards the end of the axial portion 42 that is situated on the same side as the fixed support 16, and a small-diameter annular axial portion 46 extending axially the said radial portion on the opposite side to the large-diameter axial portion 42. The axial portion 46 extends axially towards the support 16 and partially radially surrounds the tabs 38 of the support. The radial portion 44 forms an axial thrust surface for the radial surface 26b of the outer ring of the bearing.

The eccentric 22 also comprises an annular protrusion 48 provided at the free end of the axial portion 46 and extending radially inwards in the direction of the tabs 38. The protrusion 48 remains radially distant from the tabs. The protrusion 48 is situated axially between the hooks 40 and the radial wall 34 of the support 16. The protrusion 48 has an inside diameter less than the outside diameter of the hooks 40 so that axial retention of the eccentric 22 relative to the fixed support 16 can be achieved through a diametral interference fit. The protrusion 48 and the hooks 40 form complementary means that collaborate with one another to secure the eccentric 22 and the support 16 axially so that the device 10 forms a one-piece unit that can be handled, transported and mounted without the risk of its constituent elements becoming axially separated. The protrusion 48 and the hooks 40 are offset radially outwards with respect to the inner ring 28.

The device 10 also comprises a plain ring 52 pressed onto the outer surface 42b of the axial portion 42 of the eccentric, and which is designed to come radially into contact with the bore 18a of the housing 18. As an alternative, it might be possible not to provide the ring 52 and to directly fit the axial portion 42 of the eccentric against the bore 18a of the housing.

Figure 3:
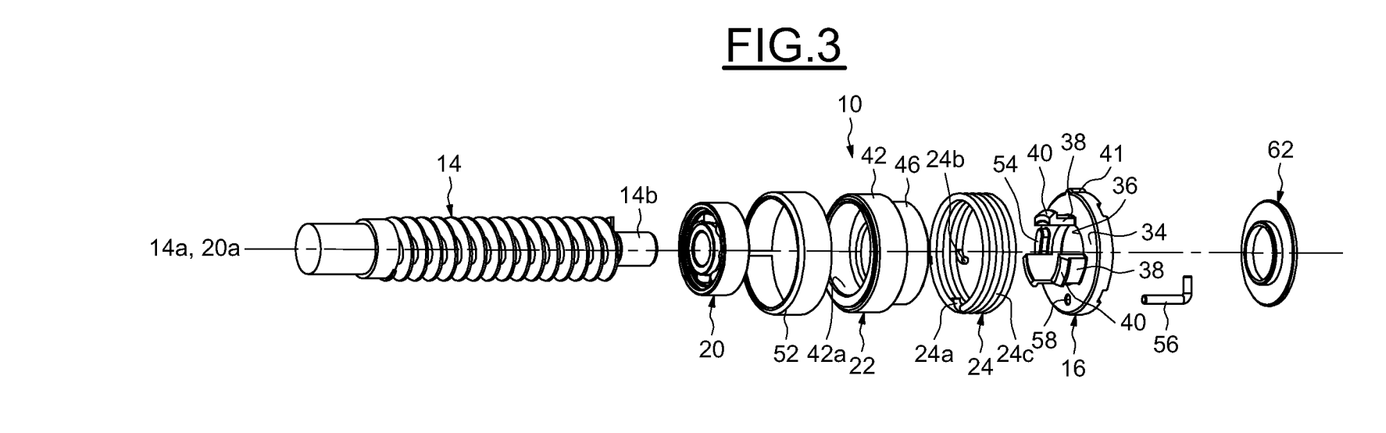
FIGS. 3 and 4 are exploded perspective views of the device of FIG. 2.

The eccentric 22 and the support 16 between them delimit an axial space in which the torsion spring 24 is placed. The spring 24 radially surrounds the axial portion 46 of the eccentric forming a centring portion for the said spring. The spring, which is coaxial with the axis 20a of the bearing, has a first end 24a that is mounted inside a complementary housing formed in the thickness of the eccentric 22 at the base of the axial portion 46. The spring 24 also has an opposite, second, end 24b (FIG. 3) which catches in the circumferential direction on a protrusion 54 formed on the radial wall 34 of the fixed support axially on the same side as the tabs 38. The spring 24 further comprises a working part 24c connecting the said ends 24a, 24b and being wound radially around the axial portion 46 of the eccentric and around the tabs 38 of the fixed support. In the embodiment illustrated, the turns of the spring 24 in cross section exhibit a circular profile. As an alternative, it is of course possible to conceive of turns that have some different profile, for example a square one.

When the device 10 is in the as-delivered condition as illustrated in FIG. 2, namely after its constituent elements have been assembled and before it is mounted on the worm 14, the spring 24 applies an axial preload to the support 16 and to the eccentric 22. The axial preload applied by the spring 24 encourages axial contact between the protrusion 48 of the eccentric and the hooks 40 of the support. The spring 24 also applies an angular preload to the support 16 and to the eccentric 22.

Figure 4:
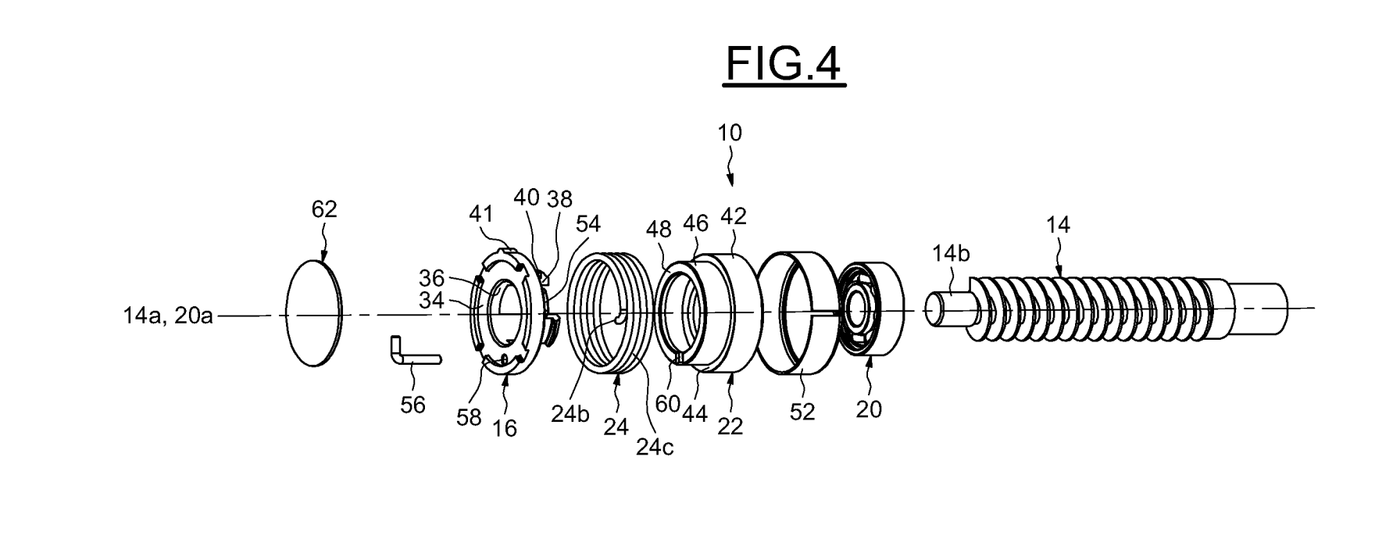

In order to prevent the eccentric 22 from rotating relative to the support 16 when the device 10 is in the assembled state prior to being mounted, the said device comprises a pin 56 extending axially both into a through-hole 58 made in the thickness of the radial wall 34 of the support and into an axial groove 60 (FIGS. 2 and 4) formed starting from the protrusion 48 and extending axially into the thickness of the axial portion 46 of the eccentric. The hole 58 and the groove 60 are axially aligned. The pin 56 forms a rotation-proofing means able temporarily to maintain the desired predetermined angular position of the eccentric 22 relative to the support 16. When the device 10 is in the assembled state, the circumferential preload force applied by the torsion spring 24 is dependent on the chosen relative angular positioning of the housing of the eccentric in which the first end 24a of the spring is mounted, of the protrusion 54 of the support on which the second end 24b of the spring is mounted, and of the hole 58 of the said support. The circumferential preload applied by the spring 24 is dependent on the angular positioning of the eccentric 22 relative to the support 16 which is maintained by the pin 56.

The device 10 further comprises a removable cover 62 (FIGS. 1, 3 and 4) designed to be mounted on the fixed support 16 against the radial wall 34 axially on the opposite side to the tabs 38. The cover 62 is centred in the bore 36 of the support and serves to close off the said bore and the hole 58 in the support axially on the opposite side to the bearing 20. The cover 62 also serves to close off the opening of the eccentric 22. The cover 62 allows the support 16 and the eccentric 22 to be closed off axially on the opposite side to the bearing 20.

To fit the device 10 onto the worm 14 and the housing 18, the procedure is as follows. In a first step, the one-piece unit formed of the bearing 20, the eccentric 22 provided with the ring 52, the spring 24, the support 16 and the pin 56, is brought into the bore 18a of the housing. The one-piece unit is introduced into the bore 18a by axial sliding such that the protrusion 41 of the support 16 becomes lodged in the groove 18c of the housing. In this pre-assembled position, the eccentric 22 is in radial contact with the bore 18a of the housing via the ring 52. In a second step, the support 16 is immobilized with respect to the housing 18, for example by upsetting or by clinching, or alternatively by mounting a circlip between the support and the housing.

Figure 5:
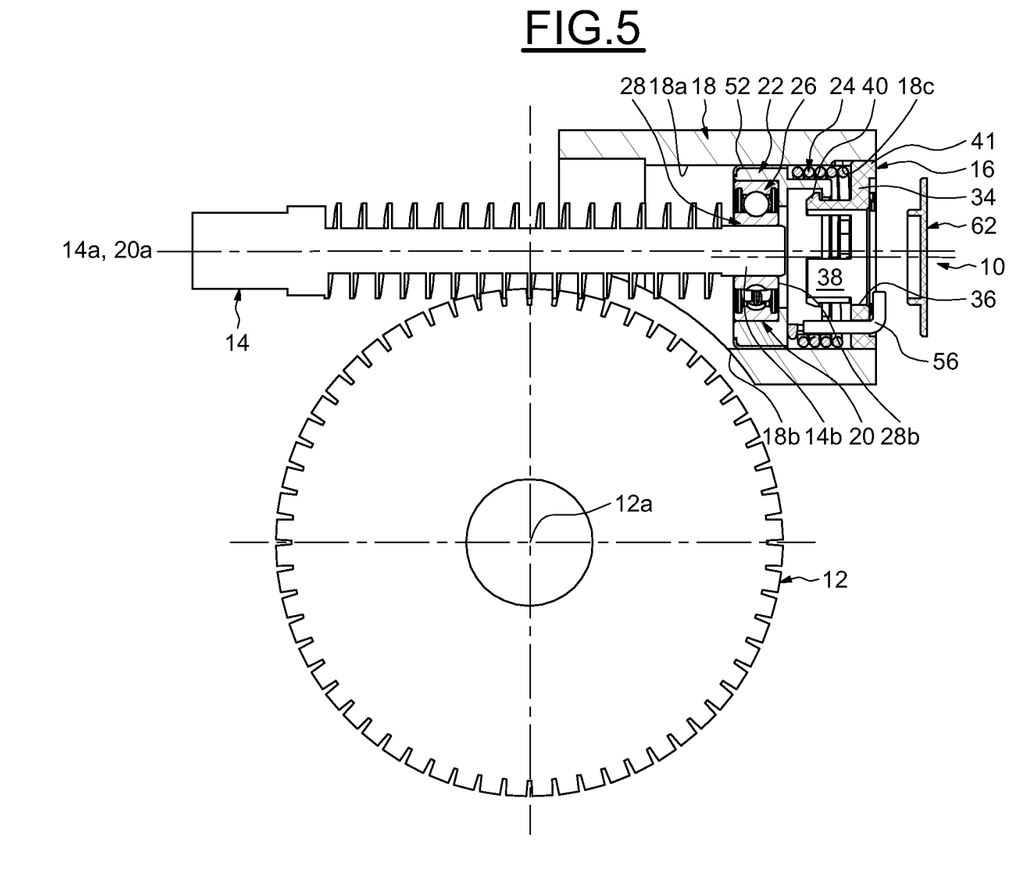
FIG. 5 is a view in axial section of the device of FIGS. 1 to 4 during mounting.

In a third step, the journal 14b of the worm is press-fitted into the bore 28a of the inner ring. The mounting of the worm 14 inside the inner ring 28 of the bearing has a tendency to cause the bearing 20 of the eccentric 22 to shift slightly in the axial direction towards the support 16. After the worm 14 has been mounted, some axial clearance remains between the protrusion 48 of the eccentric and the hooks 40 of the support, as has been illustrated in FIG. 5.

In a fourth step, the pin 56 is removed from the eccentric 22 and from the support 16 by axial sliding from the opposite side to the said eccentric. The pin 56 is removed in order to achieve coupling between these two components solely via the spring 24. Under the effect of the angular preload of the spring 24, the eccentric 22 is made to rotate about the axis 22a with respect to the housing 18, to the support 16, to the inner ring 28 and to the worm 14 into a position such as that illustrated in FIG. 1. This causes a radial movement of the bearing 20 and of the worm 14 towards the gear wheel 12. Thus, the thread or threads of the worm 14 and the teeth of the wheel 12 mesh without lash. Finally, in a fifth and final step, the cover 62 is mounted to the support 16.

During operation, the spring 24 constantly applies a circumferential force or torque to the eccentric 22 that has a tendency constantly to push the said eccentric, the bearing 20 and the worm 14 back radially towards the wheel 12. That makes it possible automatically to compensate for wear to the thread or threads of the worm 14 and/or to the teeth of the gear wheel 12 which may occur over the course of time. What actually happens in the event of wear is that the circumferential force constantly applied by the spring 24 to the eccentric 22 makes it possible to cause the said eccentric to move angularly with respect to the housing 18 and to the support 16, causing the rolling-contact bearing 20 and the worm 14 to move radially towards the wheel 12.

Figure 6:
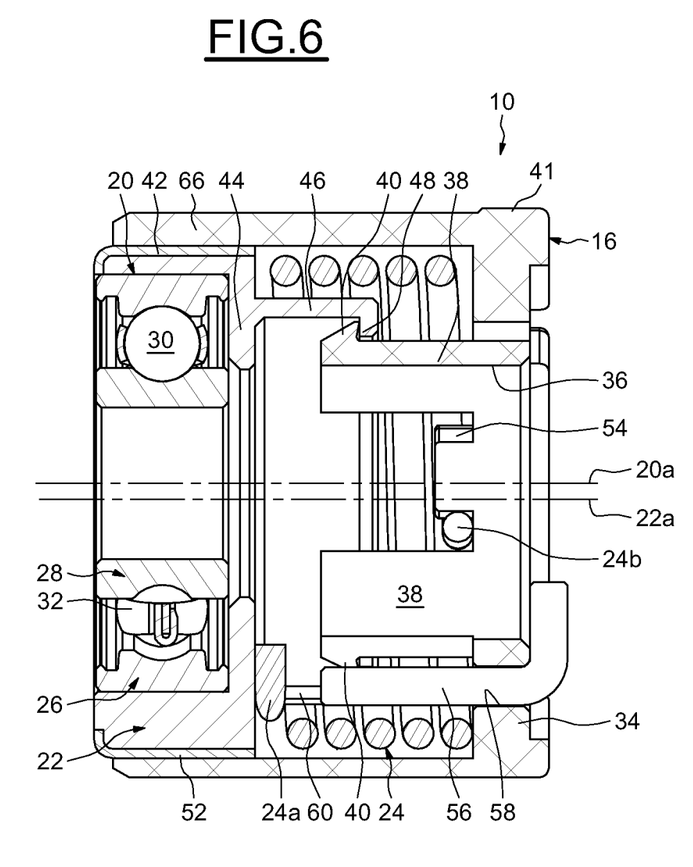
FIG. 6 is a view in axial section of a wear compensation device according to a second embodiment of the invention, after angular pre-indexing and prior to mounting.

The embodiment illustrated in FIG. 6, in which elements which are identical bear the same references, differs from the embodiment described previously in that the support 16 comprises an annular axial portion 66 extending axially from the radial wall 34 and radially surrounding the tabs 38. The axial portion 66 extends axially beyond the tabs 38 so as to form an annular housing in which the eccentric 22 and the bearing 20 are mounted. The ring 52 presses radially against the bore of the axial portion 66 of the support. In the position in which it has been mounted into the housing, the outer surface of the axial portion 66 of the support presses radially against the bore of the housing. The eccentric 22 is able to move angularly inside the axial portion 66 of the fixed support. In this embodiment, the eccentric 22 and the support 16 axially and radially delimit the space in which the spring 24 is placed.

Figure 7:
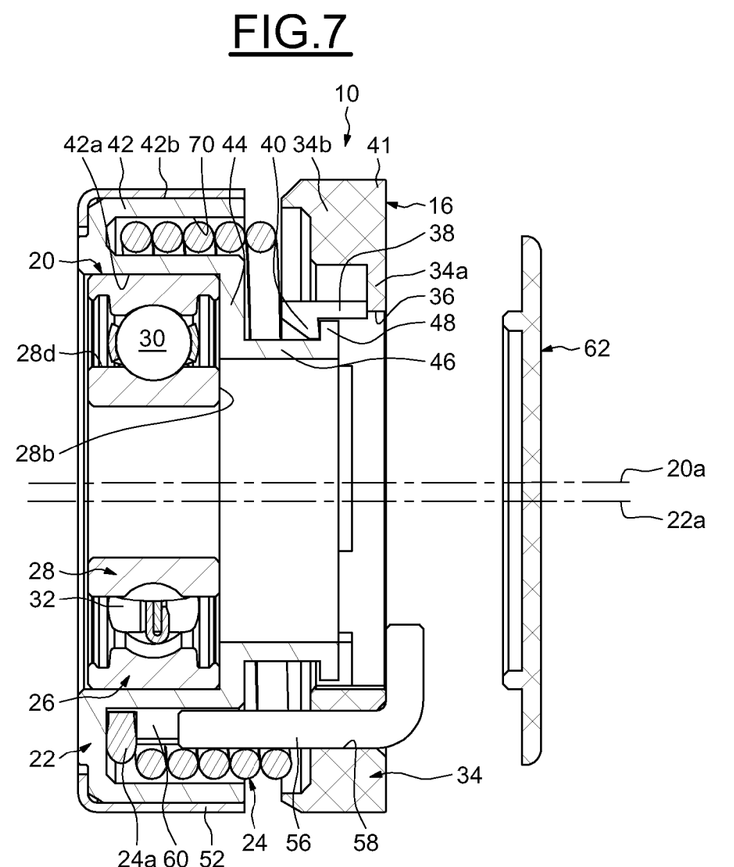
FIG. 7 is a view in axial section of a wear compensation device according to a third embodiment of the invention, after angular pre-indexing and prior to mounting.
Figure 8:
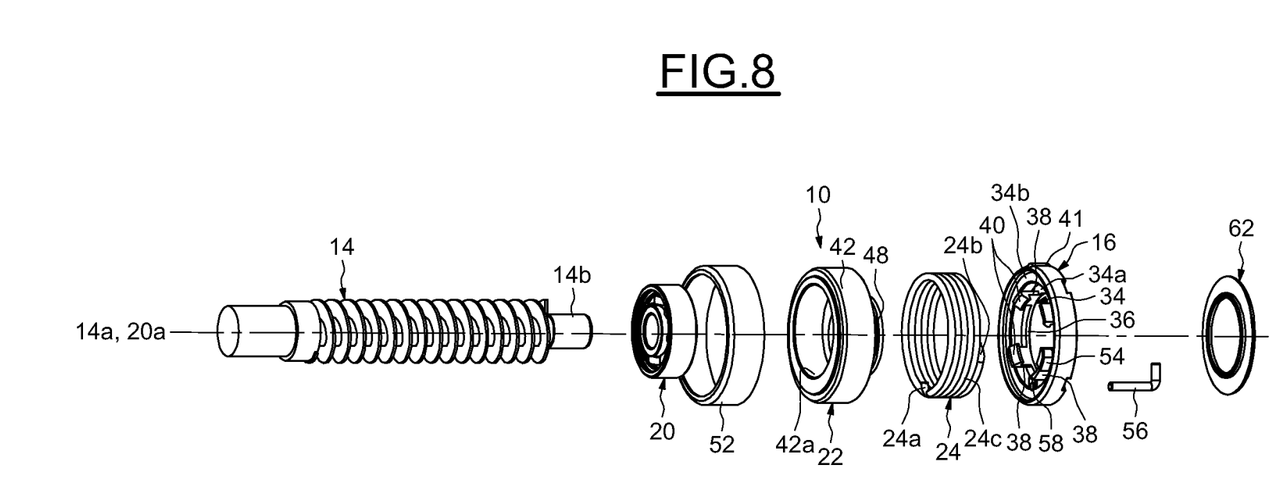
FIGS. 8 and 9 are exploded perspective views of the device of FIG. 7.
Figure 9:
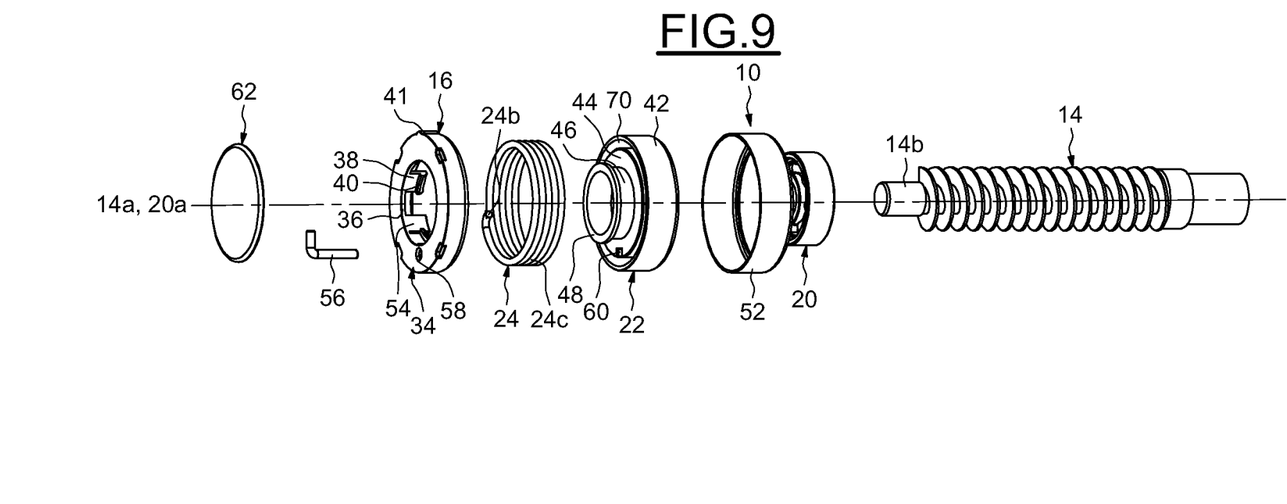

The embodiment illustrated in FIGS. 7 to 9, in which elements which are identical bear the same references, differs notably from the first embodiment in that the axial portion 46 of the eccentric has a smaller diameter and extends axially from the small-diameter edge of the radial portion 44, the annular protrusion 48 of the eccentric extending radially outwards. In this embodiment, the tabs 38 of the fixed support have a smaller axial dimension and partially radially surround the axial portion 46 of the eccentric. In this instance there are four of these tabs 38. The hooks 40 of the tabs extend radially inwards and have an inside diameter less than the outside diameter of the protrusion 48 so that the eccentric 22 can be retained axially relative to the fixed support 16 through a diametral interference fit. The protrusion 48 and the hooks 40 are offset radially outwards with respect to the inner ring 28.

The radial wall 34 of the fixed support is made up of a first annular radial part 34a of small thickness and small diameter and of a second annular radial part 34b extending the first part radially outwards and having a greater axial thickness. The tabs 38 extend axially from the first radial part 34a which delimits the bore 36. In this embodiment, the protrusion 54 of the support on which the second end 24b of the spring catches extends from the first radial part 34a of the radial wall 34. The second radial part 34b of the wall forms a bearing surface for the spring 24.

In order to reduce the axial size of the device 10, the eccentric 22 comprises, at the axial portion 42, an annular axial recess 70 formed starting from that face of the radial portion 44 that axially faces the support 16 and into which the spring 24 partially extends. The first end 24a of the spring is mounted inside a complementary housing formed in the thickness of the axial portion 42 situated radially between the recess 70 and the outer ring 26 of the bearing. The axial portion 42 of the eccentric forms a centring portion for centring the spring 24. The groove 60 in which the pin 56 for preventing the eccentric 22 from rotating relative to the support 16 is housed is provided in this instance on the axial portion 42 of the eccentric and opens in the region of the radial portion 44.

In all of the embodiments illustrated, the pin 56 provided between the eccentric 22 and the support 16 forms a means of temporarily maintaining the angular indexing of the said eccentric relative to the said support in an angular position in which the spring 24 is preloaded. This angular indexing allows the spring 24 to be preloaded between the support 16 and eccentric 22. The angular indexing may be intended to preload the torsion spring 24 to any desired torque value, for example to a maximum torque value.

The temporary maintaining means is active during transport, handling and the mounting of the device 10 on the associated housing 18 and on the worm 14. The eccentric 22 is pre-indexed relative to the support 16 before the device is delivered to the end user. The wear-compensation device 10 can undergo various handling operations in complete safety without losing the relative angular pre-indexing applied during the pre-delivery assembly.

The mounting of the device 10 by the end user is done in a simple, reliable and quick manner without the need to worry about the angular indexing of the eccentric 22 relative to the support 16, this indexing being maintained by the temporary maintaining means for as long as the end user desires. Circumferential immobilization in both directions which is maintained temporarily by the pin 56 allows the end user to dispense with any need for adjustment aimed at preloading the spring 24. A device is obtained that comprises a spring 24 which, when the device 10 is in the assembled state prior to mounting, is preloaded.

In the embodiments illustrated, the means for temporarily maintaining the angular indexing of the eccentric 22 relative to the support 16 is produced in the form of a pin 56. The pin 56 is an element that is separate and distinct from the support 16 and from the eccentric 22. Alternatively, the temporary maintaining means could comprise at least one frangible element provided on the support 16 and/or the eccentric 22, breakage of which could be brought about by the end user after the device has been mounted by manually applying a circumferential force that disengages the circumferential retention.

In the embodiments illustrated, the bearing is a rolling-contact bearing. As an alternative, the bearing could be a sliding-contact bearing comprising two rings mounted pressing radially against one another, or even a bushing or a plain bearing bush.

In the embodiments illustrated, the wear compensation device is used for a gear set of the worm and wheel type that can be mounted in a power steering mechanism. However, the device may be used for other types of skew-axis or intersecting-axis gear sets, for example a set of gear wheels, a bevel gear set, a rack and pinion gear set, and be used in other applications.

The invention claimed is:

1. A wear compensation device for a gear set, the wear compensation device comprising:
    a support for attaching the device to an external element,
    a bearing mounted on a shaft comprising at least one wheel of the gear set,
    an eccentric mounted on the bearing and able to move angularly with respect to the support, and
    an actuator mounted axially between the support and the eccentric and able to apply a circumferential force to said eccentric.

2. The wear compensation device according to claim 1, wherein the actuator is a torsion spring.

3. The wear compensation device according to claim 2, wherein the torsion spring has a first end attached to the eccentric and an opposite, second end attached to the support.

4. The wear compensation device according to claim 1, wherein the bearing provides an inner ring mounted on the shaft and an outer ring on which the eccentric is mounted.

5. The wear compensation device according to claim 4, wherein the bearing further comprises at least one row of rolling elements arranged between the rings.

6. A wear compensation device for a gear set, the wear compensation device comprising:
    a support for attaching the device to an external element,
    a bearing mounted on a shaft comprising one of the wheels of the gear set, and
    an eccentric mounted on the bearing and able to move angularly with respect to the support,
    an actuator mounted axially between the support and the eccentric and able to apply a circumferential force to the said eccentric, and
    at least one maintaining means for temporarily maintaining an angular indexing of the eccentric relative to the support in an angular position in which the actuator is preloaded between the eccentric and the support wherein the temporary-maintaining means provides a pin extending at least partially into the eccentric and the support.

7. The wear compensation device according to claim 6, wherein the temporary maintaining means is removable.

8. The wear compensation device according to claim 6, wherein the pin extends into a hole passing through the support and a groove of the eccentric.

9. The wear compensation device according to claim 8, wherein the groove extends axially into the thickness of an axial portion of the eccentric that forms a portion for centring of the actuator.

10. The wear compensation device according to claim 6, wherein the eccentric includes retaining means able to collaborate with the support to retain the eccentric axially relative to the said support.

11. The wear compensation device according to claim 10, wherein the retaining means of the eccentric are separate from the said temporary maintaining means.

12. A method of assembling a wear compensation device for a gear set comprising the steps of:
    providing a wear compensation device having; a support for attaching the device to an external element, a bearing mounted on a shaft comprising at least one wheel of the gear set, and an eccentric mounted on the bearing and able to move angularly with respect to the support, an actuator mounted axially between the support and the eccentric and able to apply a circumferential force to the said eccentric, and at least one maintaining means for temporarily maintaining the angular indexing of the eccentric relative to the support in an angular position in which the actuator is preloaded between the eccentric and the support;
    fixing the support to the element outside the device,
    mounting the shaft into the bore of the bearing,
    maintaining an angular indexing of the eccentric relative to the support, and
    removing the temporary maintaining means from the device.

13. A wear compensation device for a gear set, the wear compensation device comprising:
    a support configured to attach the device to an external element,
    a bearing mounted on a shaft,
    an eccentric mounted on the bearing and fixed thereto, the eccentric being configured to move angularly with respect to the support, the eccentric abutting a radial surface of the bearing and abutting an axial surface of the bearing, and an actuator mounted axially between and connecting the support and the eccentric, the actuator being configured to apply a circumferential force to the eccentric depending on angular rotation of the eccentric relative to the support.

14. The wear compensation device according to claim 13, wherein the support further comprises a hook configured to axially secure the eccentric to the support.

15. The wear compensation device according to claim 13, wherein the eccentric further comprises an axial portion extending from a portion of the eccentric abutting the radial surface of the bearing in a direction away from the bearing, the axial portion extending parallel to an axis of rotation of the bearing.

16. The wear compensation device according to claim 13, wherein the actuator is a torsion spring.

17. The wear compensation device according to claim 13, wherein an axis of rotation of the bearing is radially offset from an axis of rotation of the eccentric.

18. The wear compensation device according to claim 13, wherein the device further comprises a pin extending axially through the support and the eccentric, the pin configured to prevent rotation between the eccentric and the support.

19. The wear compensation device according to claim 18, wherein the pin is disengageable from the wear compensation device.

* * * * *